(12) United States Patent
Zhang et al.

(10) Patent No.: US 12,424,814 B2
(45) Date of Patent: Sep. 23, 2025

(54) METHOD AND DEVICE FOR AUTOMATICALLY LOCKING REPETITION FREQUENCY AND CARRIER-ENVELOP OFFSET FREQUENCY OF OPTICAL FREQUENCY COMB

(71) Applicant: BEIJING AEROSPACE INSTITUTE FOR METROLOGY AND MEASUREMENT TECHNOLOGY, Beijing (CN)

(72) Inventors: Zhitao Zhang, Beijing (CN); Tieli Zhang, Beijing (CN); Yinxiao Miao, Beijing (CN); Xiaoqiang Gao, Beijing (CN); Beibei Wang, Beijing (CN); Hao Liu, Beijing (CN); Yongyao Xu, Beijing (CN); Weiwei Wu, Beijing (CN); Yan Song, Beijing (CN)

(73) Assignee: BEIJING AEROSPACE INSTITUTE FOR METROLOGY AND MEASUREMENT TECHNOLOGY, Beijing (CN)

( * ) Notice: Subject to any disclaimer, the term of this patent is extended or adjusted under 35 U.S.C. 154(b) by 0 days.

(21) Appl. No.: 19/209,685

(22) Filed: May 15, 2025

(65) Prior Publication Data

US 2025/0273922 A1  Aug. 28, 2025

(30) Foreign Application Priority Data

Jul. 3, 2024 (CN) .......................... 202410882449.9

(51) Int. Cl.
*H01S 3/13* (2006.01)
*G02F 1/35* (2006.01)
(Continued)

(52) U.S. Cl.
CPC ............ *H01S 3/1305* (2013.01); *G02F 1/353* (2013.01); *H01S 3/0078* (2013.01);
(Continued)

(58) Field of Classification Search
CPC .... H01S 3/1305; H01S 3/0078; H01S 3/0405; H01S 3/1001; G02F 1/353; G02F 2203/56; G04F 5/14
See application file for complete search history.

(56) References Cited

U.S. PATENT DOCUMENTS

2024/0014625 A1* 1/2024 Zhang ................. H01S 3/08086

FOREIGN PATENT DOCUMENTS

CN 106025787 A * 10/2016 .......... H01S 3/1305
CN 113193869 A 7/2021
(Continued)

OTHER PUBLICATIONS

Z. Zhang et al., "Experiment on Repetition Rate Locking of a Fiber Optical Frequency Comb," 2022 IEEE 9th International Workshop on Metrology for AeroSpace (MetroAeroSpace), Pisa, Italy, 2022, pp. 333-336, doi: 10.1109/MetroAeroSpace54187.2022.9856184 (Year: 2022).*

(Continued)

*Primary Examiner* — Xinning(Tom) Niu

(57) ABSTRACT

A method for automatically locking frequency of an optical frequency comb is performed through locking the microwave repetition frequency signal and the microwave carrier-envelop offset frequency signal of the optical frequency comb. The microwave repetition frequency signal is subjected to filtering, frequency division, and phase discrimination with a first reference signal to obtain a first error signal. A first output frequency of the frequency synthesizer is adjusted based on a direction of the first error signal and a first voltage signal. The microwave offset frequency signal (Continued)

is subjected to filtering, frequency division, and phase discrimination with a second reference signal to obtain a second error signal. A second output frequency of the frequency synthesizer is adjusted based on a direction of the second error signal and a second voltage signal.

10 Claims, 1 Drawing Sheet

(51) Int. Cl.
*H01S 3/00* (2006.01)
*H01S 3/04* (2006.01)
*H01S 3/10* (2006.01)
*G04F 5/14* (2006.01)

(52) U.S. Cl.
CPC .......... *H01S 3/0405* (2013.01); *H01S 3/1001* (2019.08); *G02F 2203/56* (2013.01); *G04F 5/14* (2013.01)

(56) References Cited

FOREIGN PATENT DOCUMENTS

| CN | 113746546 A | 12/2021 |
|---|---|---|
| CN | 115912037 A | 4/2023 |
| CN | 117277046 A | 12/2023 |
| CN | 117559209 A | 2/2024 |

OTHER PUBLICATIONS

X. Wang et al. "Research on key technologies of high repetition rate optical frequency comb", Proceedings of the SPIE, vol. 9444, id. 94440X 6 pp. (2015) (Year: 2015).*

Xiaoqiang Gao et al., "Research on Gas Temperature Measurement Based on Dual-comb Spectroscopy Technology", Journal of Astronautic Metrology and Measurement, Dec. 31, 2023, vol. 43, No. 6, pp. 12-16.

Zhitao Zhang et al., "Experiment on Repetition Rate Locking of a Fiber Optical Frequency Comb", 9th IEEE International Workshop on Metrology for AeroSpace, Dec. 31, 2022, pp. 333-336.

* cited by examiner

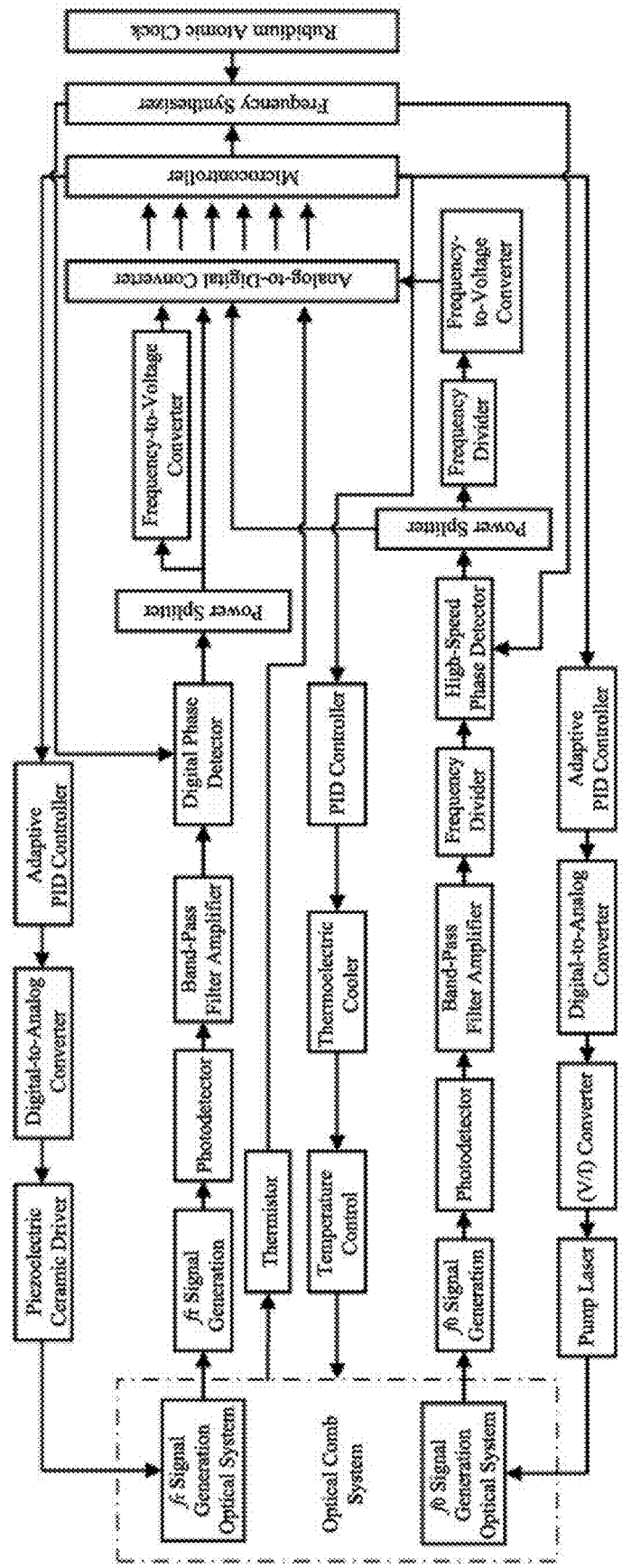

METHOD AND DEVICE FOR AUTOMATICALLY LOCKING REPETITION FREQUENCY AND CARRIER-ENVELOP OFFSET FREQUENCY OF OPTICAL FREQUENCY COMB

CROSS-REFERENCE TO RELATED APPLICATIONS

This application claims the benefit of priority from Chinese Patent Application No. 202410882449.9, filed on Jul. 3, 2024. The content of the aforementioned application, including any intervening amendments made thereto, is incorporated herein by reference in its entirety.

TECHNICAL FIELD

This application relates to frequency control, and more particular to a method and device for automatically locking repetition frequency and carrier-envelop offset frequency of optical frequency comb.

BACKGROUND

As one of the greatest inventions of the 21st century, the optical frequency comb has become the most effective tool for optical frequency measurement. It enables a simple and accurate connection between the microwave atomic frequency standard and the optical frequency standard, thereby laying a solid foundation for the development of extremely precise frequency standards. Furthermore, due to the close interrelationship among parameters such as time, length, and wavelength, the optical frequency comb also provides an ideal tool for researching absolute spatial scale measurements, demonstrating broad application prospects in manned spaceflight, spectral imaging, and modern manufacturing.

To ensure that the measurement results based on the optical frequency comb are highly reliable, it is essential to achieve high-precision, long-term locking of both the comb's repetition frequency and offset frequency. The repetition frequency is the spacing between each "tooth" in the frequency domain and is directly affected by the cavity length. Changes in temperature or mechanical vibrations can influences the cavity length, leading to drift in the repetition frequency. Meanwhile, the offset frequency, which represents the deviation of the first "tooth" from zero frequency, is susceptible to fluctuations in pump current and temperature. Currently, the frequency locking of the optical frequency comb is mainly achieved through analog locking techniques that construct a phase-locked loop using operational amplifiers for closed-loop control. In practice, this process often requires complex adjustments by an operator, increasing system complexity. Furthermore, after prolonged exposure to temperature variations and micro-vibrations, it is difficult for the frequency locking of the optical frequency comb to re-lock once it is lost, thereby limiting the comb's precision. As for automatic locking methods, existing approaches typically rely on an upper-level computer adjusting parameters of a lower-level unit. This requires both systems to operate in coordination and involves a large amount of data communication, which reduces the bandwidth of the phase-locked loop, lowers the locking precision, and may directly lead to loss of lock if any communication errors occur.

SUMMARY

In view of the above issues, the present disclosure provides a method and device for automatically locking repetition frequency and carrier-envelop offset frequency of optical frequency comb.

The technical solution is provided as follows.

A method for automatically locking repetition frequency and carrier-envelop offset frequency of optical frequency comb, comprising:

converting a repetition frequency optical signal of the optical frequency comb under a microwave frequency into a microwave repetition frequency signal $f_r$, and converting a carrier-envelop offset frequency optical signal of the optical frequency comb under the microwave frequency into a microwave carrier-envelop offset frequency signal $f_0$; wherein a repetition frequency refers to a reciprocal of a time interval between two adjacent pulses in an optical pulse train; the repetition frequency represents a pulse period in a time domain; the repetition frequency represents a spacing between adjacent comb teeth in the frequency domain; a carrier-envelop offset frequency represents an overall frequency offset of the optical pulse train;

performing automatic locking of the microwave repetition frequency signal $f_r$ through steps of:
  filtering the microwave repetition frequency signal $f_r$ to obtain a filtered signal;
  mixing the filtered signal with a first reference signal followed by phase discrimination to obtain a first error signal; wherein the first reference signal is generated by a frequency synthesizer;
  splitting the first error signal into a first sub-signal and a second sub-signal;
  converting the first sub-signal into a first voltage signal;
  adjusting a first output frequency of the frequency synthesizer based on a direction of the first error signal and the first voltage signal until a frequency of the first error signal is below 10 Hz;
  collecting, by an analog-to-digital converter, the second sub-signal;
  processing, by a first adaptive Proportion-Integration-Differentiation (PID) controller, the second sub-signal to obtain a first processed signal;
  converting, by a first digital-to-analog converter, the first processed signal into a first control signal; and
  amplifying, by a piezoelectric ceramic driver, the first control signal to control a piezoelectric ceramic, so as to achieve automatic locking of the microwave repetition frequency signal $f_r$; and performing automatic locking of the microwave offset frequency signal $f_0$ through steps of:
  subjecting the microwave offset frequency signal $f_0$ to filtering, frequency division, and phase discrimination with a second reference signal to obtain a second error signal;
  splitting the second error signal into a third sub-signal and a fourth sub-signal;
  subjecting the third sub-signal to down-conversion to obtain a second voltage signal;
  adjusting a second output frequency of the frequency synthesizer based on a direction of the second error signal and the second voltage signal until a frequency of the second error signal is below 100 Hz;
  collecting, by the analog-to-digital converter, the fourth sub-signal;
  processing, by a second adaptive PID controller, the fourth sub-signal to obtain a second processed signal;
  converting, by a second digital-to-analog converter, the second processed signal into a second control signal;
  converting the second control signal into a control current; and applying the control current to a pump laser to control an output light intensity of the pump laser, so as to achieve automatic locking of the microwave offset frequency signal $f_0$.

In an embodiment, the frequency synthesizer is traceable to a rubidium atomic clock, and is controlled by a microcontroller.

In an embodiment, the step of adjusting the first output frequency of the frequency synthesizer comprises:
- acquiring, by the analog-to-digital converter, a plurality of first voltage values of the first voltage signal;
- recording, by the microcontroller, the plurality of first voltage values;
- adjusting, by the microcontroller, the first output frequency of the frequency synthesizer at a first preset interval based on the plurality of first voltage values;
- acquiring, by the analog-to-digital converter, a plurality of second voltage values of the first voltage signal;
- recording, by the microcontroller, the plurality of second voltage values;
- comparing the plurality of first voltage values with the plurality of second voltage values to determine the direction of the first error signal; and
- adjusting, by the microcontroller, the first output frequency of the frequency synthesizer based on the direction of the first error signal and the frequency of the first error signal until the frequency of the first error signal is below 10 Hz;
- the step of adjusting the second output frequency of the frequency synthesizer comprises:
- acquiring, by the analog-to-digital converter, a plurality of third voltage values of the second voltage signal;
- recording, by the microcontroller, the plurality of third voltage values;
- adjusting, by the microcontroller, the second output frequency of the frequency synthesizer after a second preset time, based on the plurality of third voltage values;
- acquiring, by the analog-to-digital converter, a plurality of fourth voltage values of the second voltage signal;
- recording, by the microcontroller, the plurality of fourth voltage values;
- comparing the plurality of third voltage values with the plurality of fourth voltage values to determine the direction of the second error signal; and
- adjusting, by the microcontroller, the second output frequency of the frequency synthesizer based on the direction of the second error signal and the frequency of the second error signal, until the frequency of the second error signal is below 100 Hz.

In an embodiment, after the step of self-locking the frequency of the optical signal of the $f_r$ comprising:
- detecting and determining, by the microcontroller, whether an output voltage of the first digital-to-analog converter deviates by 0.2V from a threshold voltage; wherein the first digital-to-analog converter is controlled by the microcontroller;
  - if yes, adjusting, a current output frequency of the frequency synthesizer based on a direction change of the output voltage of the first digital-to-analog converter, until the output voltage of the first digital-to-analog converter returns to a value when the optical signal of the $f_r$ is locked.

In an embodiment, the step of performing automatic locking of the microwave repetition frequency signal $f_r$, the method further comprises:
- determining whether the microwave repetition frequency signal $f_r$ loses lock;
  - if yes, disabling a closed-loop control of the first adaptive PID controller; and
  - returning to the step of performing automatic locking of the microwave repetition frequency signal $f_r$.

In an embodiment, after the step of performing automatic locking of the microwave offset frequency signal $f_0$, the method further comprises:
- detecting and determining, by the microcontroller, whether an output voltage of the second digital-to-analog converter deviates by 0.1V from a threshold voltage; wherein the second digital-to-analog converter is controlled by the microcontroller;
  - if yes, adjusting, a current output frequency of the frequency synthesizer based on a direction change of the output voltage of the second digital-to-analog converter, until the output voltage of the second digital-to-analog converter returns to a value recorded when the microwave carrier-envelop offset frequency signal $f_0$ is locked.

In an embodiment, after the step of performing automatic locking of the microwave offset frequency signal $f_0$, the method further comprises:
- determining whether the microwave carrier-envelop offset frequency signal $f_0$ loses lock;
  - if yes, disabling a closed-loop control of the second adaptive PID controller; and
  - returning to the step of performing automatic locking of the microwave offset frequency signal $f_0$.

In an embodiment, the method further comprising:
- regulating, by a PID controller, a thermoelectric (TEC) cooler of a laser cavity to either heat or cool, based on a temperature measured inside the laser cavity, thereby stabilizing the temperature at $25\pm0.05°$ C.

A device for automatically locking repetition frequency and carrier-envelop offset frequency of optical frequency comb, comprising:
- a repetition frequency automatic locking unit; and
- a carrier-envelop offset frequency automatic locking unit;
- wherein the repetition frequency automatic locking unit comprises:
- a first photodetector;
- a first band-pass filter amplifier;
- a digital phase detector;
- a first power splitter;
- a first frequency-to-voltage converter;
- a first digital-to-analog converter;
- a microcontroller;
- a rubidium atomic clock;
- a frequency synthesizer;
- a first adaptive PID controller;
- an analog-to-digital converter; and
- a piezoelectric ceramic driver;
- wherein the first photodetector is configured to convert a repetition frequency optical signal of the optical frequency comb under a microwave frequency into a microwave repetition frequency signal $f_r$; wherein a repetition frequency refers to a reciprocal of a time interval between two adjacent pulses in an optical pulse train; the repetition frequency represents a pulse period in a time domain; the repetition frequency represents a spacing between adjacent comb teeth in the frequency domain;
- the first band-pass filter amplifier is configured to filter the microwave repetition frequency signal $f_r$ to obtain a filtered repetition frequency signal;

the digital phase detector is configured to mix the filtered repetition frequency signal with a first reference signal for phase discrimination to obtain a first error signal; wherein the first reference signal is generated by the frequency synthesizer; the frequency synthesizer is traceable to the rubidium atomic clock and is controlled by the microcontroller;

the first power splitter is configured to split the first error signal into a first sub-signal and a second sub-signal; wherein the first sub-signal is transmitted to the first frequency-to-voltage converter;

the first frequency-to-voltage converter is configured to convert the first sub-signal into a first voltage signal;

the analog-to-digital converter is configured to acquire the first voltage signal;

the microcontroller is configured to adjust a first output frequency of the frequency synthesizer based on a direction of first voltage signal and the first error signal until a frequency of the first error signal is below 10 Hz;

the analog-to-digital converter is configured to acquire the second sub-signal after adjustment of the first output frequency of the frequency synthesizer;

the first adaptive PID controller is configured to process the second sub-signal to obtain a first processed signal;

the first digital-to-analog converter is configured to convert the first processed signal into a first control signal; and the piezoelectric ceramic driver is configured to amplify the first control signal, so as to achieve automatic locking of the microwave repetition frequency signal $f_r$;

wherein the carrier-envelop offset frequency automatic locking unit comprises:
a second photodetector;
a second band-pass filter amplifier;
a first frequency divider;
a high-speed phase detector;
a second power splitter;
a second frequency divider;
a second frequency-to-voltage converter;
a second adaptive PID controller;
a second digital-to-analog converter,
a voltage to current (V/I) converter;
a pump laser;
the analog-to-digital converter;
the microcontroller;
the rubidium atomic clock; and
the frequency synthesizer;

wherein the second photodetector is configured to convert a carrier-envelop offset frequency optical signal of the optical frequency comb under the microwave frequency into a microwave carrier-envelop offset frequency signal $f_0$; a carrier-envelop offset frequency represents an overall frequency offset of the optical pulse train;

the second band-pass filter amplifier is configured to filter the microwave carrier-envelop offset frequency signal $f_0$ to obtain a filtered carrier-envelop offset frequency signal;

the first frequency divider is configured to divide the filtered carrier-envelop offset frequency signal to obtain a divided carrier-envelop offset frequency signal;

the high-speed phase detector is configured to perform phase discrimination for the divided carrier-envelop offset frequency signal and a second reference signal to obtain a second error signal; wherein the second reference signal is generated by the frequency synthesizer;

the second power splitter is configured to split the second error signal into a third sub-signal and a fourth sub-signal;

the second frequency divider is configured to divide the third sub-signal into a divided sub-signal;

the second frequency-to-voltage converter is configured to convert the divided sub-signal into a second voltage signal;

the analog-to-digital converter is configured to acquire the second voltage signal;

the microcontroller is further configured to adjust a second output frequency of the frequency synthesizer based on a direction of the second voltage signal and the second error signal until a frequency of the second error signal is below 100 Hz;

the analog-to-digital converter is further configured to acquire the fourth sub-signal after adjustment of the second output frequency of the frequency synthesizer;

the second adaptive PID controller is configured to process the fourth sub-signal to obtain a second processed signal; and the second digital-to-analog converter is configured to convert the first processed signal into a second control signal;

the V/I converter is configured to convert the second control signal into a control current, which is applied to the pump laser; and the pump laser is configured to control an output light intensity based on the control current, so as to achieve automatic locking of the microwave carrier-envelop offset frequency signal $f_0$.

In an embodiment, the device further comprising:
a temperature control unit;
wherein the temperature control unit comprises:
a TEC cooler; and
a thermistor;
wherein the TEC cooler and the thermistor are installed inside a laser cavity; the thermistor is configured to serve as a temperature sensor to monitor an internal temperature of the laser cavity, the TEC cooler is configured to adjust the internal temperature.

The technical solution provided herein has the following benefits.

(1) The technical solution provided herein effectively solves complex frequency locking operations in optical frequency combs that use analog locking circuits, and it also addresses large data volumes and reduced reliability in communications between the lower-level and upper-level controllers in digital locking systems. Once the optical frequency comb stabilizes after startup, it can automatically lock both the repetition frequency and the carrier-envelope offset frequency, greatly broadening its range of applications. Furthermore, the technical solution provided herein allows for wide-range adjustment of the frequency synthesizer (on the order of hundreds and thousands of Hz), thereby enabling automatically locking repetition frequency and carrier-envelop offset frequency of an optical frequency comb over a broad frequency band.

(2) The technical solution provided herein can adjust the reference signal frequency in real time according to the locking state of the optical frequency comb, achieving tracking locking.

(3) When the optical frequency comb loses lock due to sudden environmental factors such as vibrations, the technical solution provided herein is capable of re-locking in under 200 ms.

(4) Because the repetition frequency and carrier-envelop offset frequency of the optical frequency comb are significantly affected by temperature, the technical solution provided herein controls the thermoelectric cooler (TEC) to stabilize the temperature environment in the laser cavity. This ensures that the optical system remains at a constant temperature, thereby reducing frequency drift in both the repetition frequency and carrier-envelop offset frequency and laying the foundation for long-term frequency locking.

(5) By eliminating the need for analog components and external devices such as the upper-level controller during the frequency locking process, the device provided herein achieves frequency locking in a very compact space, thereby facilitating the miniaturization of the optical frequency comb.

BRIEF DESCRIPTION OF THE DRAWINGS

FIG. 1 schematically shows the composition of the device for automatically locking repetition frequency and carrier-envelop offset frequency of optical frequency comb according to an embodiment of the present disclosure.

DETAILED DESCRIPTION OF EMBODIMENTS

The present disclosure will be described in further detail below with reference to the accompanying drawings and embodiments.

The method for automatically locking repetition frequency and carrier-envelop offset frequency of optical frequency comb provided herein adopts the digital phase-locked loop control to achieve automatic locking of both the optical frequency comb's repetition frequency and carrier-envelop offset frequency, and can also perform tracking locking as well as re-locking after a loss of lock.

The repetition frequency signal generation optical system is a femtosecond laser oscillator. Since both the repetition frequency and the carrier-envelop offset frequency of the optical frequency comb are highly affected by temperature, it is first necessary to maintain a constant temperature within the laser cavity of the femtosecond laser oscillator. Specifically, a thermistor with a resistance of 10K at standard temperature is used as the temperature sensor inside the laser cavity. A microcontroller controls an analog-to-digital converter to read the thermistor's resistance in real time, converting this value to temperature via an empirical formula. Based on the current temperature, the microcontroller, through a PID controller, controls the TEC cooler within the cavity to heat or cool, thereby stabilizing the temperature of the laser cavity at 25±0.05° C. This stabilization minimizes the frequency drift of both the optical frequency comb's repetition frequency and carrier-envelop offset frequency, laying the foundation for long-term frequency locking.

Based on the stabilization of the temperature of the laser cavity, the next step is to lock the frequencies of the optical frequency comb's repetition frequency and carrier-envelop offset frequency. The carrier-envelop offset frequency signal generation optical system generates the carrier-envelop offset frequency optical signal of the optical frequency comb, while the repetition frequency signal generation optical system generates the repetition frequency optical signal of the optical frequency comb. These optical signals are converted into electrical signals by photodetectors (PD), thereby converting them into microwave signals and yielding a microwave repetition frequency signal $f_r$ and a microwave carrier-envelop offset frequency signal $f_0$.

For the microwave repetition frequency signal $f_r$, to effectively extract the fundamental microwave signal of the microwave repetition frequency signal $f_r$, the higher harmonic components are filtered out using the first band-pass filter amplifier, retaining only the fundamental signal. The filtered repetition frequency signal is then mixed with the first reference signal (a frequency signal) in a digital phase detector, whose output is a triangular waveform error signal. The first reference signal is generated by a frequency synthesizer traceable to a rubidium atomic clock, with the frequency synthesizer being controlled by the microcontroller.

To optimize the locking state of the microwave repetition frequency signal $f_r$ of the optical frequency comb, the first error signal is divided into the first sub-signal and the second sub-signal via the first power splitter. The first sub-signal is fed through a first frequency-to-voltage converter (with an effective conversion bandwidth of 20 kHz and a corresponding direct current (DC) conversion voltage range of 0-5 V) to convert the frequency error signal into a DC voltage signal. This DC voltage value of the DC voltage signal represents the magnitude of the current frequency error signal. Since the phase error signal output by the digital phase detector only reflects the difference in phase between the filtered repetition frequency signal and the first reference signal but cannot determine the absolute relationship between the filtered repetition frequency signal and the first reference signal, the microcontroller needs to record first voltage values acquired by the analog-to-digital converter. Then, after a 5 ms interval, the frequency synthesizer's frequency is adjusted based on differences in the first voltage values. The microcontroller then records second voltage values acquired by the analog-to-digital converter after the adjustment. The first voltage values are compared with the second voltage values to determine the direction of the first error signal generated by the phase discrimination between the current filtered repetition frequency signal and the first reference signal. Based on the direction of this error signal and the frequency value corresponding to the voltage obtained from the frequency-to-voltage conversion, the microcontroller further adjusts the frequency synthesizer to bring the frequency of the frequency synthesizer sufficiently close to the frequency of the filtered repetition frequency signal (ensuring that the error signal frequency is below 10 Hz) so that direct locking can be subsequently achieved. After adjusting the frequency synthesizer's output frequency, the second sub-signal split by the first power splitter is directly acquired by the microcontroller via the analog-to-digital converter. The microcontroller processes the acquired error signal, which is then fed into the first adaptive PID controller. The first adaptive PID controller adjusts its proportional, integral, and derivative parameters in real time according to the signal state to achieve optimal tuning. The output from the first adaptive PID controller is then sent through a first digital-to-analog converter (which outputs a voltage ranging from 0-5 V, with a default mid-level output of 2.5 V). This output is amplified 30-fold by a piezoelectric ceramic (PZT) driver to achieve an output voltage of 0-150 V, which in turn controls the extension or contraction of the PZT within the cavity, thereby adjusting the cavity length and realizing negative feedback automatic locking of the microwave repetition frequency signal $f_r$ of the optical frequency comb.

During the process of continuously locking the microwave repetition frequency signal $f_r$, the microcontroller monitors the output voltage (first control signal) of the first digital-to-analog converter in real time. When this output voltage deviates by 0.2 V from a threshold (defined by the maximum and minimum output voltages of the first digital-to-analog converter), the frequency synthesizer's output frequency is adjusted based on the direction of the voltage change. For example, if the output voltage of the first DAC approaches 0 V, the frequency of the first reference signal is gradually decreased so that the output voltage of first DAC moves back toward 2.5 V; conversely, if the output voltage of the first DAC approaches 5 V, the first reference signal frequency is gradually increased so that the output voltage of the first DAC returns to approximately 2.5 V. This adjustment continues until the output voltage of the first DAC once again reaches the level corresponding to the locked state of the microwave repetition frequency signal $f_r$ of the optical frequency comb, thereby achieving tracking locking.

When the optical frequency comb loses lock due to external factors, the microcontroller detects the change in the output voltage from the first frequency-to-voltage converter and determines that the system has lost lock. It then disables the closed-loop control of the first adaptive PID controller. Following the method for automatic locking of the microwave repetition frequency signal $f_r$ of the optical frequency comb, the microcontroller searches for the optimal reference frequency output from the frequency synthesizer (until the frequency of the first error signal falls below 10 Hz), readjusts the frequency synthesizer's output frequency, and then re-establishes closed-loop locking, thereby re-locking the microwave repetition frequency signal $f_r$ of the optical frequency comb after a lock loss of the microwave repetition frequency signal $f_r$.

The process of locking the microwave carrier-envelop offset frequency signal $f_0$ is similar to the process of locking the microwave repetition frequency signal $f_r$. A second band-pass amplifier is appropriate to achieve effective extraction and amplification of the microwave carrier-envelop offset frequency signal $f_0$ based on the characteristics of the microwave carrier-envelop offset frequency signal $f_0$. Due to the fast drift speed of the microwave carrier-envelop offset frequency signal $f_0$, which can reach the order of hundreds of kHz or even MHz, conventional mixers or phase detectors cannot effectively perform phase discrimination. Therefore, the microwave carrier-envelop offset frequency signal $f_0$ is first divided using the first frequency divider with 16 or higher divisions, ensuring that the microwave carrier-envelop offset frequency signal $f_0$ is reduced to a lower rate. Although the microwave carrier-envelop offset frequency signal $f_0$ is divided, the drift speed remains relatively high, reaching tens of kHz. Therefore, a high-speed phase detector is used to effectively perform phase discrimination between the divided microwave carrier-envelop offset frequency signal and a second reference signal, which is generated from the frequency synthesizer referenced to the rubidium atomic clock. The effective phase discrimination bandwidth of the high-speed phase detector reaches the MHz level, ensuring a high signal-to-noise ratio error signal output (second error signal) even under MHz-range jitter. After phase discrimination, to optimize the locking state of the microwave carrier-envelop offset frequency signal $f_0$, the second error signal is split into two a third sub-signal and a fourth sub-signal using a second power divider. The third sub-signal is further divided using a second frequency divider to obtain a divided carrier-envelop offset frequency signal, ensuring that the divided carrier-envelop offset frequency signal input to the second frequency-to-voltage converter (which has an effective conversion bandwidth of 20 kHz and outputs a DC voltage range of 0-5V) remains below 20 kHz. Similar to the process of locking the microwave repetition frequency signal $f_r$, the second error signal alone cannot determine the relative magnitude of the divided carrier-envelop offset frequency signal and the second reference signal. Therefore, the output voltage of a second frequency-to-voltage converter is digitized using an analog-to-digital converter and recorded by the microcontroller. The microcontroller then adjusts the frequency synthesizer over a larger range (on the kHz level) based on the recorded voltage, tracking changes in the second output voltage of frequency-to-voltage converter. This prevents misjudgments caused by carrier-envelop offset frequency signal jitter and allows the correct determination of the direction of the second error signal. Next, based on the direction of the second error signal and the voltage value acquired from the second frequency-to-voltage converter, the microcontroller adjusts the output frequency of the frequency synthesizer so that the second reference signal closely matches the divided carrier-envelop offset frequency signal (to within 100 Hz after division). After adjusting the output frequency of the frequency synthesizer, the microcontroller processes the fourth sub-signal, acquired via an analog-to-digital converter, using a second adaptive PID controller. The processed result is sent to a second digital-to-analog converter, generating an output voltage (0-3V, with a default midpoint output of 1.5V). Since the locking of the microwave carrier-envelop offset frequency signal $f_0$ is achieved through current regulation, the second control signal output from the second digital-to-analog converter is converted to current (0-3V corresponding to 0-20 mA) via a V/I converter. This control current is applied to the pump laser, enabling automatic locking of the microwave carrier-envelop offset frequency signal $f_0$. The stability of the carrier-envelop offset frequency optical signal is directly affected by temperature and the stability of the pump laser output. After implementing temperature control inside the femtosecond laser oscillator cavity, the control current generated in the closed-loop locking process is applied to the pump laser, modulating its optical power. This effectively enhances the stability of the pump laser's optical power output, thereby achieving the locking of the microwave carrier-envelop offset frequency signal $f_0$.

During the continuous locking process of the microwave carrier-envelop offset frequency signal $f_0$, the microcontroller continuously monitors the output voltage of the second digital-to-analog converter. When the output voltage approaches the threshold voltage within 0.1V (where the threshold is defined as the maximum and minimum output voltages of the second digital-to-analog converter), the microcontroller adjusts the frequency synthesizer's output frequency according to the direction of voltage change. For instance, if the output voltage of the second digital-to-analog converter approaches 0V, the frequency of the second reference signal is gradually decreased to bring the voltage back toward 1.5V; conversely, if the output voltage approaches 3V, the frequency of the second reference signal is gradually increased to restore the voltage to around 1.5V. This ensures that the adjusted output voltage of the second digital-to-analog converter returns to the locked-state voltage of the microwave carrier-envelop offset frequency signal $f_0$, thereby achieving tracking and locking the microwave carrier-envelop offset frequency signal $f_0$.

If the microwave carrier-envelop offset frequency signal $f_0$ loses lock due to external influences, the microcontroller detects the loss of lock based on changes in the output voltage of the second frequency-to-voltage converter and disables the closed-loop control of the second adaptive PID controller. It then follows the automatic locking procedure for the microwave carrier-envelop offset frequency signal $f_0$, searching for the optimal reference frequency output of the frequency synthesizer and readjusting the frequency synthesizer output frequency before re-engaging closed-loop locking. This enables the re-locking of the microwave carrier-envelop offset frequency signal $f_0$ after lock loss.

The present disclosure also provides a device for automatically locking frequency of an optical frequency comb, including a temperature control unit, a repetition frequency automatic locking unit and a carrier-envelop offset frequency automatic locking unit.

The temperature control unit includes a TEC cooler and a thermistor, both of which are installed inside the laser cavity. The thermistor serves as a temperature sensor to monitor the cavity temperature. A thermistor with a resistance of 10KΩ at the standard temperature is adopted. The microcontroller controls an analog-to-digital converter to read the thermistor resistance in real time and converts it using an empirical formula to obtain the temperature reading.

As shown in FIG. 1, the repetition frequency automatic locking unit includes a first photodetector, a first band-pass filter amplifier, a digital phase detector, a first power splitter, a first frequency-to-voltage converter, a first digital-to-analog converter, a microcontroller, a rubidium atomic clock, a frequency synthesizer, a first adaptive PID controller, an analog-to-digital converter and a piezoelectric ceramic driver.

The first photodetector is configured to convert a repetition frequency optical signal of the optical frequency comb under a microwave frequency into a microwave repetition frequency signal $f_r$.

The first band-pass filter amplifier is configured to filter the microwave repetition frequency signal $f_r$ to obtain a filtered repetition frequency signal.

The digital phase detector is configured to mix the filtered $f_r$ signal with a first reference signal for phase discrimination to obtain a first error signal. The first reference signal is generated by the frequency synthesizer; the frequency synthesizer is traceable to the rubidium atomic clock and is controlled by the microcontroller.

The first power splitter is configured to split the first error signal into a first sub-signal and a second sub-signal. The first sub-signal is transmitted to the first frequency-to-voltage converter. The first frequency-to-voltage converter is configured to convert the first sub-signal into a first voltage signal. The analog-to-digital converter is configured to acquire the first voltage signal. The microcontroller is configured to adjust a first output frequency of the frequency synthesizer based on a direction of the first voltage signal and the first error signal until a frequency of the first error signal is below 10 Hz.

The analog-to-digital converter is configured to acquire the second sub-signal after adjustment of the first output frequency of the frequency synthesizer. The first adaptive PID controller is configured to process the second sub-signal to obtain a first processed signal. The first digital-to-analog converter is configured to convert the first processed signal into a first control signal.

The piezoelectric ceramic driver is configured to amplify the first control signal, so as to lock the microwave repetition frequency signal $f_r$.

The carrier-envelop offset frequency automatic locking unit includes a second photodetector, a second band-pass filter amplifier, a first frequency divider, a high-speed phase detector, a second power splitter, a second frequency divider, a second frequency-to-voltage converter, a second adaptive PID controller, a second digital-to-analog converter, a V/I converter, a pump laser, the analog-to-digital converter, the microcontroller, the rubidium atomic clock and the frequency synthesizer. The analog-to-digital converter, the microcontroller, the rubidium atomic clock and the frequency synthesizer are also used in the repetition frequency automatic locking unit.

The second photodetector is configured to convert a carrier-envelop offset frequency optical signal of the optical frequency comb under the microwave frequency into a microwave carrier-envelope offset frequency signal $f_0$. A carrier-envelop offset frequency represents an overall frequency offset of the optical pulse train.

The second band-pass filter amplifier is configured to filter the microwave carrier-envelop offset frequency signal $f_0$ to obtain a filtered carrier-envelop offset frequency signal.

The first frequency divider is configured to divide the filtered carrier-envelop offset frequency signal to obtain a divided carrier-envelop offset frequency signal.

The high-speed phase detector is configured to perform phase discrimination for the divided carrier-envelop offset frequency signal and a second reference signal to obtain a second error signal. The second reference signal is generated by the frequency synthesizer.

The second power splitter is configured to split the second error signal into a third sub-signal and a fourth sub-signal. The second frequency divider is configured to divide the third sub-signal into a divided sub-signal. The second frequency-to-voltage converter is configured to convert the divided sub-signal into a second voltage signal. The analog-to-digital converter is configured to acquire the second voltage signal. The microcontroller is further configured to adjust a second output frequency of the frequency synthesizer based on a direction of the second voltage signal and the second error signal until a frequency of the second error signal is below 100 Hz.

The analog-to-digital converter is further configured to acquire the fourth sub-signal after adjustment of the second output frequency of the frequency synthesizer. The second adaptive PID controller is configured to process the fourth sub-signal to obtain a second processed signal. The second digital-to-analog converter is configured to convert the first processed signal into a second control signal.

The V/I converter is configured to convert the second control signal into a control current, which is applied to the pump laser.

The pump laser is configured to control an output light intensity based on the control current, so as to achieve automatic locking of the microwave carrier-envelop offset frequency signal $f_0$.

It should be noted that the disclosed embodiments are merely exemplary, and are not limited to limit the present disclosure. It should be understood that those changes, modifications and replacements made without departing from the spirit of the disclosure shall fall within the scope of the disclosure defined by the appended claims.

What is claimed is:

1. A method for automatically locking repetition frequency and carrier-envelope offset frequency of optical frequency comb, comprising:
  converting a repetition frequency optical signal of the optical frequency comb under a microwave frequency into a microwave repetition frequency signal $f_r$, and converting a carrier-envelope offset frequency optical signal of the optical frequency comb under the microwave frequency into a microwave carrier-envelope offset frequency signal $f_0$; wherein a repetition frequency refers to a reciprocal of a time interval between two adjacent pulses in an optical pulse train; the repetition frequency represents a pulse period in a time domain; the repetition frequency represents a spacing between adjacent comb teeth in the frequency domain; a carrier-envelope offset frequency represents an overall frequency offset of the optical pulse train;

performing automatic locking of the microwave repetition frequency signal $f_r$ through steps of:
    filtering the microwave repetition frequency signal $f_r$ to obtain a filtered signal;
    mixing the filtered signal with a first reference signal followed by phase discrimination to obtain a first error signal; wherein the first reference signal is generated by a frequency synthesizer;
    splitting the first error signal into a first sub-signal and a second sub-signal;
    converting the first sub-signal into a first voltage signal;
    adjusting a first output frequency of the frequency synthesizer based on a direction of the first error signal and the first voltage signal until a frequency of the first error signal is below 10 Hz;
    collecting, by an analog-to-digital converter, the second sub-signal;
    processing, by a first adaptive Proportion-Integration-Differentiation (PID) controller, the second sub-signal to obtain a first processed signal;
    converting, by a first digital-to-analog converter, the first processed signal into a first control signal; and
    amplifying, by a piezoelectric ceramic driver, the first control signal to control a piezoelectric ceramic, so as to achieve automatic locking of the microwave repetition frequency signal $f_r$; and performing automatic locking of the microwave offset frequency signal $f_0$ through steps of:
    subjecting the microwave offset frequency signal $f_0$ to filtering, frequency division, and phase discrimination with a second reference signal to obtain a second error signal;
    splitting the second error signal into a third sub-signal and a fourth sub-signal;
    subjecting the third sub-signal to down-conversion to obtain a second voltage signal;
    adjusting a second output frequency of the frequency synthesizer based on a direction of the second error signal and the second voltage signal until a frequency of the second error signal is below 100 Hz;
    collecting, by the analog-to-digital converter, the fourth sub-signal;
    processing, by a second adaptive PID controller, the fourth sub-signal to obtain a second processed signal;
    converting, by a second digital-to-analog converter, the second processed signal into a second control signal;
    converting the second control signal into a control current; and
    applying the control current to a pump laser to control an output light intensity of the pump laser, so as to achieve automatic locking of the microwave offset frequency signal $f_0$.

2. The method of claim 1, wherein the frequency synthesizer is traceable to a rubidium atomic clock, and is controlled by a microcontroller.

3. The method of claim 2, wherein the step of adjusting the first output frequency of the frequency synthesizer comprises:
    acquiring, by the analog-to-digital converter, a plurality of first voltage values of the first voltage signal;
    recording, by the microcontroller, the plurality of first voltage values;
    adjusting, by the microcontroller, the first output frequency of the frequency synthesizer at a first preset interval based on the plurality of first voltage values;
    acquiring, by the analog-to-digital converter, a plurality of second voltage values of the first voltage signal;
    recording, by the microcontroller, the plurality of second voltage values;
    comparing the plurality of first voltage values with the plurality of second voltage values to determine the direction of the first error signal; and
    adjusting, by the microcontroller, the first output frequency of the frequency synthesizer based on the direction of the first error signal and the frequency of the first error signal until the frequency of the first error signal is below 10 Hz;

the step of adjusting the second output frequency of the frequency synthesizer comprises:
    acquiring, by the analog-to-digital converter, a plurality of third voltage values of the second voltage signal;
    recording, by the microcontroller, the plurality of third voltage values;
    adjusting, by the microcontroller, the second output frequency of the frequency synthesizer after a second preset time, based on the plurality of third voltage values;
    acquiring, by the analog-to-digital converter, a plurality of fourth voltage values of the second voltage signal;
    recording, by the microcontroller, the plurality of fourth voltage values;
    comparing the plurality of third voltage values with the plurality of fourth voltage values to determine the direction of the second error signal; and
    adjusting, by the microcontroller, the second output frequency of the frequency synthesizer based on the direction of the second error signal and the frequency of the second error signal, until the frequency of the second error signal is below 100 Hz.

4. The method of claim 2, wherein after the step of performing automatic locking of the microwave repetition frequency signal $f_r$, the method further comprises:
    detecting and determining, by the microcontroller, whether an output voltage of the first digital-to-analog converter deviates by 0.2V from a threshold voltage; wherein the first digital-to-analog converter is controlled by the microcontroller;
    if yes, adjusting, a current output frequency of the frequency synthesizer based on a direction change of the output voltage of the first digital-to-analog converter, until the output voltage of the first digital-to-analog converter returns to a value when the microwave repetition frequency signal $f_r$ is locked.

5. The method of claim 1, wherein after the step of performing automatic locking of the microwave repetition frequency signal $f_r$, the method further comprises:
    determining whether the microwave repetition frequency signal $f_r$ loses lock;
    if yes, disabling a closed-loop control of the first adaptive PID controller; and
    returning to the step of performing automatic locking of the microwave repetition frequency signal $f_r$.

6. The method of claim 2, wherein after the step of performing automatic locking of the microwave offset frequency signal $f_0$, the method further comprises:
    detecting and determining, by the microcontroller, whether an output voltage of the second digital-toanalog converter deviates by 0.1V from a threshold voltage; wherein the second digital-to-analog converter is controlled by the microcontroller;
  if yes, adjusting, a current output frequency of the frequency synthesizer based on a direction change of the output voltage of the second digital-to-analog converter, until the output voltage of the second digital-to-analog converter returns to a value recorded when the microwave carrier-envelope offset frequency signal $f_0$ is locked.

7. The method of claim 1, wherein after the step of performing automatic locking of the microwave offset frequency signal $f_0$, the method further comprises:
  determining whether the microwave carrier-envelope offset frequency signal $f_0$ loses lock;
    if yes, disabling a closed-loop control of the second adaptive PID controller; and
    returning to the step of performing automatic locking of the microwave offset frequency signal $f_0$.

8. The method of claim 1, further comprising:
  regulating, by a PID controller, a thermoelectric (TEC) cooler of a laser cavity to either heat or cool, based on a temperature measured inside the laser cavity, thereby stabilizing the temperature at 25±0.05° C.

9. A device for automatically locking repetition frequency and carrier-envelope offset frequency of optical frequency comb, comprising:
  a repetition frequency automatic locking unit; and
  a carrier-envelope offset frequency automatic locking unit;
  wherein the repetition frequency automatic locking unit comprises:
    a first photodetector;
    a first band-pass filter amplifier;
    a digital phase detector;
    a first power splitter;
    a first frequency-to-voltage converter;
    a first digital-to-analog converter;
    a microcontroller;
    a rubidium atomic clock;
    a frequency synthesizer;
    a first adaptive PID controller;
    an analog-to-digital converter; and
    a piezoelectric ceramic driver;
  wherein the first photodetector is configured to convert a repetition frequency optical signal of the optical frequency comb under a microwave frequency into a microwave repetition frequency signal $f_r$; wherein a repetition frequency refers to a reciprocal of a time interval between two adjacent pulses in an optical pulse train; the repetition frequency represents a pulse period in a time domain; the repetition frequency represents a spacing between adjacent comb teeth in the frequency domain;
  the first band-pass filter amplifier is configured to filter the microwave repetition frequency signal $f_r$ to obtain a filtered repetition frequency signal;
  the digital phase detector is configured to mix the filtered repetition frequency signal with a first reference signal for phase discrimination to obtain a first error signal; wherein the first reference signal is generated by the frequency synthesizer; the frequency synthesizer is traceable to the rubidium atomic clock and is controlled by the microcontroller;
  the first power splitter is configured to split the first error signal into a first sub-signal and a second sub-signal;
  wherein the first sub-signal is transmitted to the first frequency-to-voltage converter;
  the first frequency-to-voltage converter is configured to convert the first sub-signal into a first voltage signal;
  the analog-to-digital converter is configured to acquire the first voltage signal;
  the microcontroller is configured to adjust a first output frequency of the frequency synthesizer based on a direction of the first voltage signal and the first error signal until a frequency of the first error signal is below 10 Hz;
  the analog-to-digital converter is configured to acquire the second sub-signal after adjustment of the first output frequency of the frequency synthesizer;
  the first adaptive PID controller is configured to process the second sub-signal to obtain a first processed signal;
  the first digital-to-analog converter is configured to convert the first processed signal into a first control signal; and
  the piezoelectric ceramic driver is configured to amplify the first control signal, so as to achieve automatic locking of the microwave repetition frequency signal $f_r$;
  wherein the carrier-envelope offset frequency automatic locking unit comprises:
    a second photodetector;
    a second band-pass filter amplifier;
    a first frequency divider;
    a high-speed phase detector;
    a second power splitter;
    a second frequency divider;
    a second frequency-to-voltage converter;
    a second adaptive PID controller;
    a second digital-to-analog converter,
    a voltage to current (V/I) converter;
    a pump laser;
    the analog-to-digital converter;
    the microcontroller;
    the rubidium atomic clock; and
    the frequency synthesizer;
  wherein the second photodetector is configured to convert a carrier-envelope offset frequency optical signal of the optical frequency comb under the microwave frequency into a microwave carrier-envelope offset frequency signal $f_0$; a carrier-envelope offset frequency represents an overall frequency offset of the optical pulse train;
  the second band-pass filter amplifier is configured to filter the microwave carrier-envelope offset frequency signal $f_0$ to obtain a filtered carrier-envelope offset frequency signal;
  the first frequency divider is configured to divide the filtered carrier-envelope offset frequency signal to obtain a divided carrier-envelope offset frequency signal;
  the high-speed phase detector is configured to perform phase discrimination for the divided carrier-envelope offset frequency signal and a second reference signal to obtain a second error signal; wherein the second reference signal is generated by the frequency synthesizer;
  the second power splitter is configured to split the second error signal into a third sub-signal and a fourth sub-signal;
  the second frequency divider is configured to divide the third sub-signal into a divided sub-signal;

the second frequency-to-voltage converter is configured to convert the divided sub-signal into a second voltage signal;
the analog-to-digital converter is configured to acquire the second voltage signal;
the microcontroller is further configured to adjust a second output frequency of the frequency synthesizer based on a direction of the second voltage signal and the second error signal until a frequency of the second error signal is below 100 Hz;
the analog-to-digital converter is further configured to acquire the fourth sub-signal after adjustment of the second output frequency of the frequency synthesizer;
the second adaptive PID controller is configured to process the fourth sub-signal to obtain a second processed signal; and
the second digital-to-analog converter is configured to convert the first processed signal into a second control signal;
the V/I converter is configured to convert the second control signal into a control current, which is applied to the pump laser; and
the pump laser is configured to control an output light intensity of the pump laser based on the control current, so as to achieve automatic locking of the microwave carrier-envelope offset frequency signal $f_0$.

10. The device of claim 9, further comprising:
a temperature control unit;
wherein the temperature control unit comprises:
a TEC cooler; and
a thermistor;
wherein the TEC cooler and the thermistor are installed inside a laser cavity; the thermistor is configured to serve as a temperature sensor to monitor an internal temperature of the laser cavity, the TEC cooler is configured to adjust the internal temperature.

* * * * *